(12) United States Patent
Kürpick et al.

(10) Patent No.: US 8,281,248 B2
(45) Date of Patent: Oct. 2, 2012

(54) COLLABORATION APPLICATION AND METHOD

(75) Inventors: Peter Kürpick, Frankfurt am Main (DE); Jens Henniger, Darmstadt (DE); Guido Laures, Heidelberg (DE); Daniel Hirth, Zürich (CH); Thomas Stoesser, Darmstadt (DE); Björn Müller, Bammental (DE)

(73) Assignee: Software AG, Darmstadt (DE)

( * ) Notice: Subject to any disclaimer, the term of this patent is extended or adjusted under 35 U.S.C. 154(b) by 692 days.

(21) Appl. No.: 11/949,151

(22) Filed: Dec. 3, 2007

(65) Prior Publication Data

US 2008/0244419 A1 Oct. 2, 2008

(30) Foreign Application Priority Data

Feb. 14, 2007 (EP) ..................... 07003156

(51) Int. Cl.
G06F 3/00 (2006.01)

(52) U.S. Cl. ........ 715/753; 715/751; 715/755; 715/756; 715/758; 709/205; 709/206

(58) Field of Classification Search .......... 715/750–753, 715/758, 759, 733; 709/204–255
See application file for complete search history.

(56) References Cited

U.S. PATENT DOCUMENTS

| | | | |
|---|---|---|---|
| 6,457,045 B1 * | 9/2002 | Hanson et al. ................. | 709/206 |
| 6,498,955 B1 * | 12/2002 | McCarthy et al. ................ | 700/1 |
| 6,559,863 B1 * | 5/2003 | Megiddo ........................ | 715/753 |
| 6,676,521 B1 * | 1/2004 | La Mura et al. ................ | 463/42 |
| 6,760,748 B1 * | 7/2004 | Hakim .......................... | 709/204 |
| 7,007,235 B1 * | 2/2006 | Hussein et al. ................. | 715/751 |
| 7,171,448 B1 * | 1/2007 | Danielsen et al. ............. | 709/205 |
| 7,818,198 B2 * | 10/2010 | Masselle et al. .............. | 705/7.18 |
| 2002/0099775 A1 * | 7/2002 | Gupta et al. .................. | 709/205 |
| 2002/0194226 A1 * | 12/2002 | Sheth et al. ................... | 707/517 |
| 2003/0033302 A1 * | 2/2003 | Banerjee et al. ................ | 707/6 |
| 2003/0149681 A1 * | 8/2003 | Frees et al. ..................... | 707/1 |
| 2003/0233274 A1 * | 12/2003 | Urken et al. .................... | 705/12 |
| 2004/0046021 A1 * | 3/2004 | Chung .......................... | 235/386 |
| 2004/0158495 A1 | 8/2004 | Gennaro et al. | |
| 2005/0086230 A1 * | 4/2005 | Frees et al. ...................... | 707/10 |

(Continued)

FOREIGN PATENT DOCUMENTS

CN 1414497 4/2003

(Continued)

OTHER PUBLICATIONS

European search report and written opinion for application No. EP 07003156.2, mailed Sep. 5, 2007.

*Primary Examiner* — Tuyetlien Tran
*Assistant Examiner* — Abimbola Ayeni
(74) *Attorney, Agent, or Firm* — Meyertons Hood Kivlin Kowert & Goetzel, P.C.; Jeffrey C. Hood

(57) ABSTRACT

Collaboration by a plurality of users in an application. The application may include processing logic and a user interface. The user interface may include at least one control element adapted to receive collaborative input, where the at least one control element may be linked to a collaboration utility. The collaboration utility may be adapted to generate the collaborative input for the control element based on the individual inputs of at least some of the plurality of users.

21 Claims, 10 Drawing Sheets

U.S. PATENT DOCUMENTS

Figure 1:
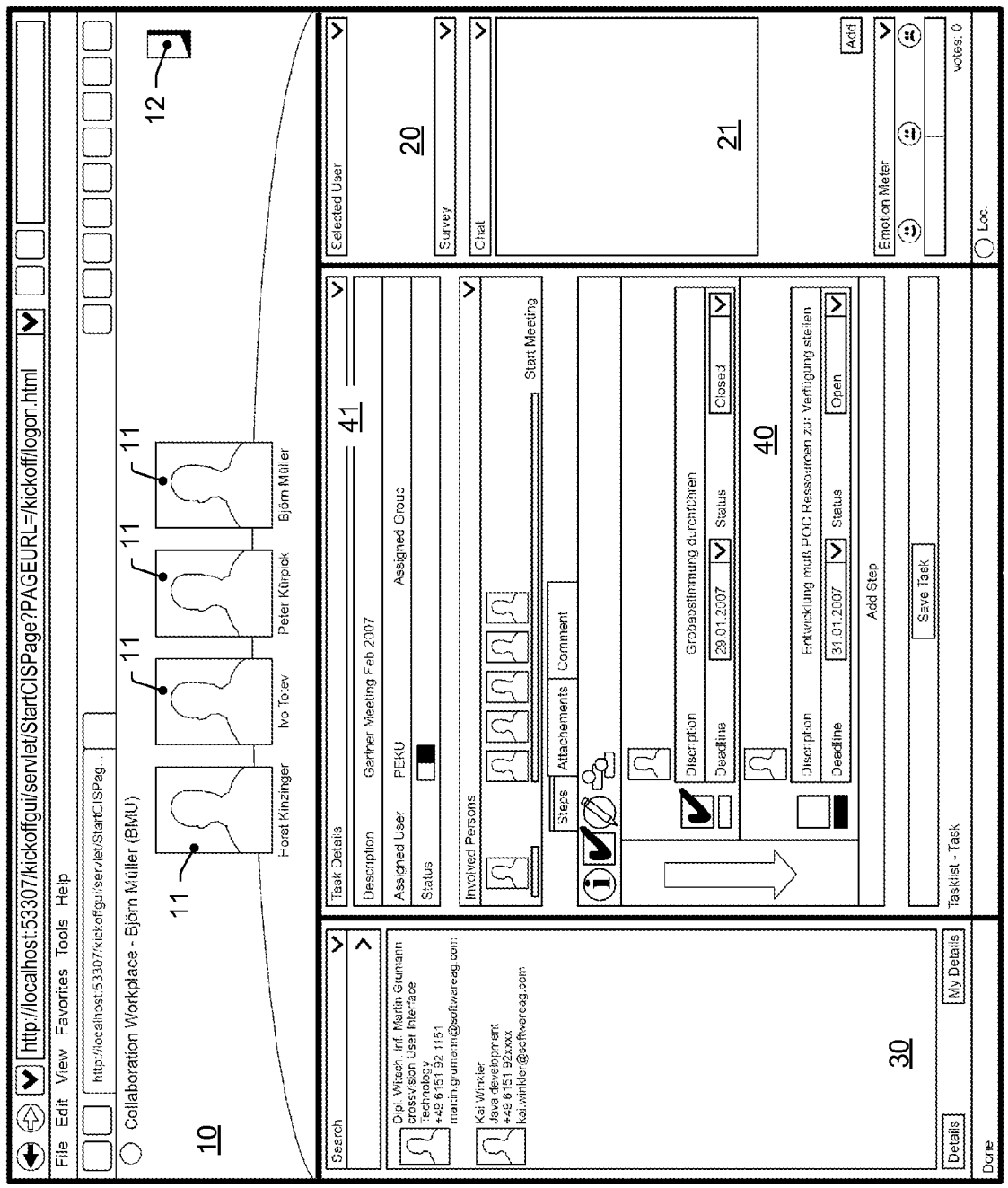

| | | |
|---|---|---|
| 2005/0125246 A1* | 6/2005 | Muller et al. .................... 705/1 |
| 2006/0010197 A1 | 1/2006 | Ovenden |
| 2006/0053096 A1* | 3/2006 | Subramanian et al. ........... 707/3 |
| 2006/0053196 A1* | 3/2006 | Spataro et al. ................ 709/205 |
| 2006/0171308 A1* | 8/2006 | Jung et al. .................... 370/229 |
| 2006/0293943 A1* | 12/2006 | Tischhauser et al. ............. 705/9 |
| 2007/0058796 A1* | 3/2007 | Schmidt et al. .......... 379/202.01 |
| 2007/0288278 A1* | 12/2007 | Alexander et al. ............... 705/8 |
| 2008/0126488 A1* | 5/2008 | O'Sullivan et al. ........... 709/206 |
| 2008/0294483 A1* | 11/2008 | Williams ......................... 705/8 |
| 2009/0070678 A1* | 3/2009 | Landar et al. ................. 715/733 |
| 2009/0084837 A1* | 4/2009 | Kalech et al. ................... 235/51 |

FOREIGN PATENT DOCUMENTS

| | | |
|---|---|---|
| EP | 1705913 | 9/2006 |
| WO | 2007001603 | 1/2007 |

* cited by examiner

FIG. 2

```
public interface ICollaborationBus
{
    public IMeeting openMeeting (String leadUserId);
    public Imeeting getMeeting (String userId);
    public void loadUserData (UserInfo[ ] users);
    public void addCollaborationBusListener (String userId, ICollaborationBusListener listener);
    public UserInfo getUserInfo (String userId);
}
```

*FIG. 6A*

```
Public class CollaborationBusFactory
{
    ...
    public static ICollaborationBus getInstance (String busName)
    {
        ...
    }
}
```

*FIG. 6B*

```
Public interface IMeeting
{
    public void addParticipants (String [ ] userIds);
    public void removeParticipant (String userId);
    public ParticipantInfo [ ] getParticipants ( );
    public ParticipantInfo [ ] getActiveParticipants ();
    public ParticipantInfo getParcipantInfo (String userId);
    public void requestParticipant (String userId);
    public void acceptParticipation (String userId);
    public void denyParticipation (String userId);

public void shareDocumentation (String document);
    public String getSharedDocument ();

public void defineLeader (String userId);
    public void defineTaskLeader (String userId);

public void closeMeeting ();

// utilities
    public IChat getChat ();
    public IEmotionTracker get EmotionTracker ();
    public ISurveyManager getSurveyManager ();
    public IScheduleManager getScheduleManager ();
}
```

*FIG. 7*

```
public interface iSurveyManager
{
        public ISurvey createSurvey (String question, String [ ] answers);
        public Isurvey getCurrentSurvey ();
        public ISurvey [ ] get Surveys();
        public void removeSurvey (String surveyId);
} public interface ISurvey
{
        public String getQuestion ();
        public String [ ] getAnswer ();
        public void vote (SurveyVoting voting);
        public int getNumberofVoters ();
        public SurveyVoting [ ] getVotings ();
        public void finish ();
        public SurveyResult get Result ();
}
```

FIG. 8

```
Public interface ISchedulerManager
{
        public IScheduler createScheduler   (String subject, CDate startDate,
                                             CDate endDate, CDate proposalDate,
                                             boolean weekendSelectable);
        Public IScheduler getCurrentScheduler ();
        Public IScheduler [ ] getScheduler ();
        public void removeScheduler (Scheduler scheduler);
} public interface IScheduler
{
        public String getSubject();
        public CDate getStartDate ();
        public CDate getEndDate ();
        public CDate getProposalDate(CDate value);
        public void setProsposalDate(CDate value);
        public void vote(SchedulerVoiting voiting);
        public int getNumberofVotings ();
        public SchedulerVoting [ ] get Votings ();
        public boolean isFinished ();
        public void finish ();
        public boolean isWeekendSelctable ();
        public Scheduler getResult ();
}
```

FIG. 9

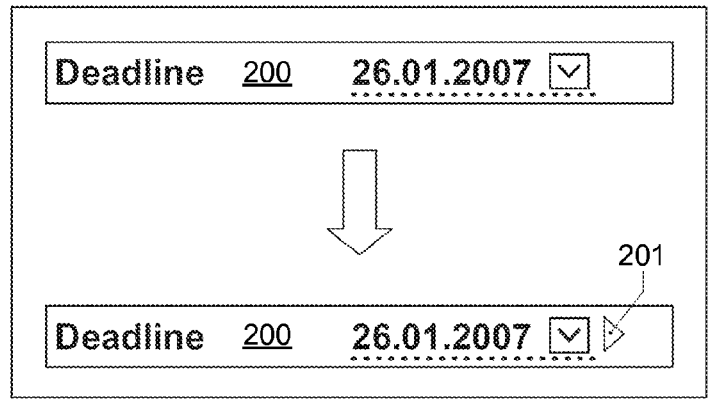

FIG. 12

```
public class AplicationXYU
{
    IMeeting m_meeting;
    String m_documentNumber;
    ...
    public void onShareDocument ( )
    {
        ...
        m_meeting.shareDocument ("PurchaseOrder /"+m_documentNumber);
        ...
    }
    ...
}
```

FIG. 13A

```
public class AplicationXYU
{
    IMEETING m_meeting
    Stirng m_documentNumber;
    ...
    public void onSynchronized()
    {
        ...
        ParticipantInfo pi = m_meeting.getParticipantInfo(m_user)
    }
    ...
} public class ParticipantInfo
{
    String user;
    String meetingRole; //leader/observer
    String taskRole; // leader/observer
}
```

FIG. 13B

COLLABORATION APPLICATION AND METHOD

PRIORITY CLAIM

This application claims benefit of priority of European application no. 07 003 156.2 titled "Collaboration Application and Method", filed Feb. 14, 2007, and whose inventors are Peter Kürpick, Jens Henniger, Guido Laures, Daniel Hirth, Thomas Stoesser, and Björn Müller.

INCORPORATED BY REFERENCE

European application no. 07 003 156.2 titled "Collaboration Application and Method", filed Feb. 14, 2007, and whose inventors are Peter Kürpick, Jens Henniger, Guido Laures, Daniel Hirth, Thomas Stoesser, and Björn Müller, is hereby incorporated by reference in its entirety as though fully and completely set forth herein.

TECHNICAL FIELD

The present invention relates to an application adapted for collaboration by a plurality of users, and more particularly to a collaboration system and method for enabling collaboration of a plurality of users in the operation of an application.

DESCRIPTION OF THE RELATED ART

Collaboration in the operation of a software application is becoming more and more important. There are many situations where multiple users, which may be in different locations, need to collaborate and work together on a software application. For example, a plurality of engineers from different development teams may collaborate to design a new machine part using a common CAD/CAM application. As another example, a plurality of accountants may use an application to collaboratively process business data of a company.

In the prior art, there are many collaboration systems known, such as video conferencing systems or Internet tools, e.g., online chat programs, the online sharing of documents etc. These prior art solutions for online collaboration typically operate more or less independently from (or parallel to) the operation of the user interface of the application. Another approach is known from a word processing and spreadsheet application offered by Google Inc. for collaborative operation. Here the contribution of each participant is correspondingly marked up and the screen displays are fully synchronized. This approach may be sufficient for word processing or similarly simple tasks. However, this approach may not apply to technically more advanced applications which may require a real collaboration of a plurality of users.

Correspondingly, improvements in online collaboration are desired.

SUMMARY OF THE INVENTION

Various embodiments are presented of a method for performing online collaboration.

In one embodiment, an application may be executed for collaboration by a plurality of users, where the application includes processing logic and a user interface. The user interface may include at least one control element adapted to receive collaborative input, wherein the at least one control element is linked to a collaboration utility, the collaboration utility being adapted to generate the collaborative input for the control element based on the individual inputs of at least some of the plurality of users.

Rather than operating the application and one or more collaboration utilities more or less independently from each other, a suitable utility may be connected directly to the respective control element of the user interface of the application. The at least one control element may include a collaborative icon adapted to initiate the linked collaboration utility. The control element may be, for example, a date control element and the collaboration utility may be a scheduler adapted to generate a collaborative input date based on calendar entries of at least some of the users. If the control element serves to select one option among several options, the collaboration utility is preferably a survey utility inviting at least some of the users to vote for one option and generating the collaboratively selected option.

According to a further aspect, the application may be further adapted to restrict the right to operate the user interface to one user at a time, wherein the right can be passed from one user to another. The application may include a user interface for each of the users, wherein the user interfaces are adapted to be synchronized in response to a command of the user having presently the right to operate the application.

In one embodiment, a collaboration system may include an application as described above. The collaboration system may further include a collaboration screen for the display of the user interface, with a collaborative utilities area displaying one or more collaborative utilities and a meeting area displaying graphical identifiers for each of the plurality of users.

Accordingly, the application and the collaboration of the plurality of users are not only linked via the at least one control element and its collaboration utility, but also by the simultaneous display on the collaboration screen. The meeting area, which may display the participating users, may intuitively reflect the situation in a real meeting and therefore further supports the collaboration of the users. The graphical identifiers are preferably images or video streams showing the respective user, which may be presented with varying styles to reflect different roles of the related user during a meeting. In one embodiment, the content of the user interface in the collaboration screen depends on an authorization profile of the respective user. Since the collaboration of the users is technically realized by the one or more collaboration utilities generating collaborative input, it may no longer be necessary that all users see the same user interface of the application. As a result, there is a by far greater amount of security provided than in the prior art, wherein the whole desktop is indiscriminately shared by all participants of a virtual meeting.

In one embodiment, the collaboration system may be adapted to be presented by browsers of the plurality of users and the processing logic is adapted to be implemented in one or more processing servers. The collaborative system may further include a collaborative bus, which may be adapted to be implemented in one or more servers and which serves to maintain application data shared by the plurality of users. The collaboration bus may include an interface for performing collaborative functions, when executing the application. The interface highly abstracts the complexity of exchanging data in a distributed environment with the plurality of users, e.g., it may hide any specific distribution topology running the collaboration bus on one or more servers together or separated from the application and the user sessions.

In some embodiments, a method for enabling collaboration of a plurality of users in the operation of an application, the application comprising a user interface and processing logic, may include providing at least one control element of the user interface which is linked to a collaboration utility, the collaboration utility being adapted to generate a collaborative input for the control element based on the individual inputs of at least some of the plurality of users, and processing the collaborative input with the processing logic of the application In one embodiment step the control element may be modified to receive individual input so that it is bound to the collaboration utility. Accordingly, providing the at least one control element may include adding a collaborative icon to the control element, the icon being adapted to initiate the linked collaboration utility.

As a result, the method may be non-invasive, i.e., the processing logic of an application revised for collaboration may not need to be changed. In these embodiments, only the user interface may be modified by extending one or more user controls with the collaborative icon for the respective collaboration utility.

Further improvements of the above described application and method are envisioned.

SHORT DESCRIPTION OF THE DRAWINGS

Figure 3:
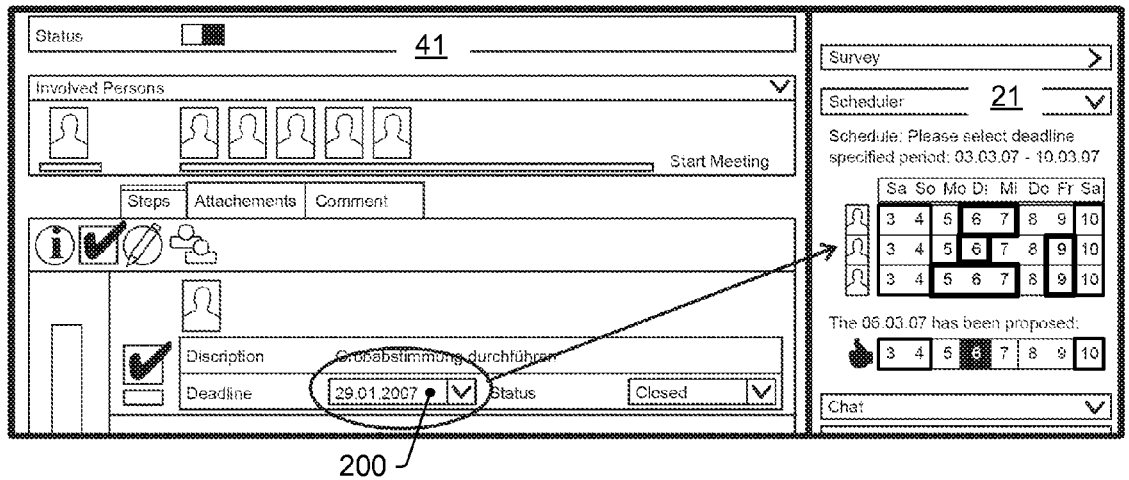
Figure 4:
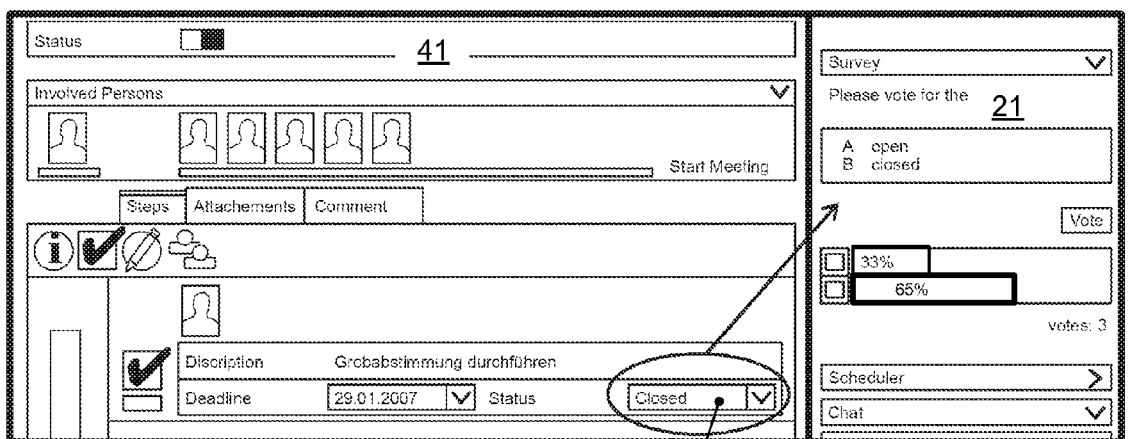
Figure 5A:
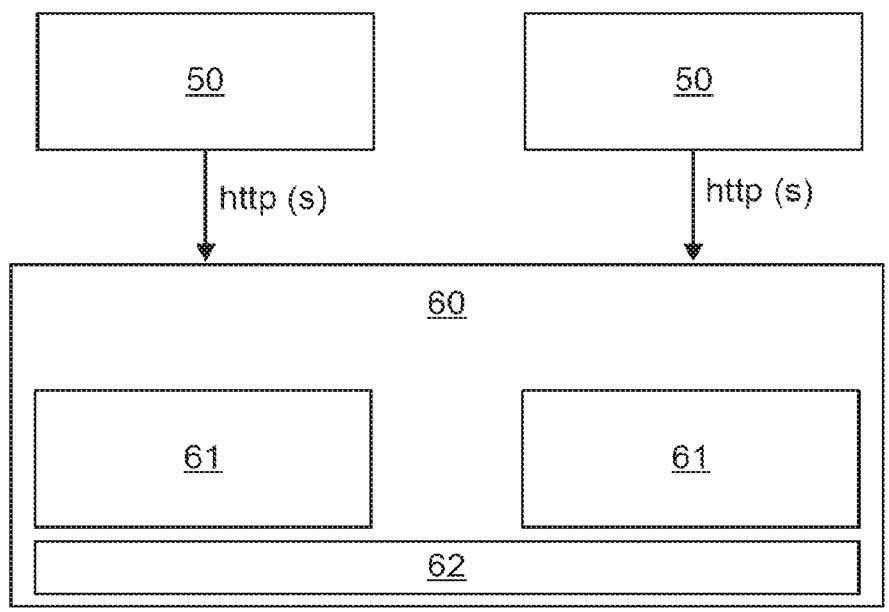
Figure 5B:
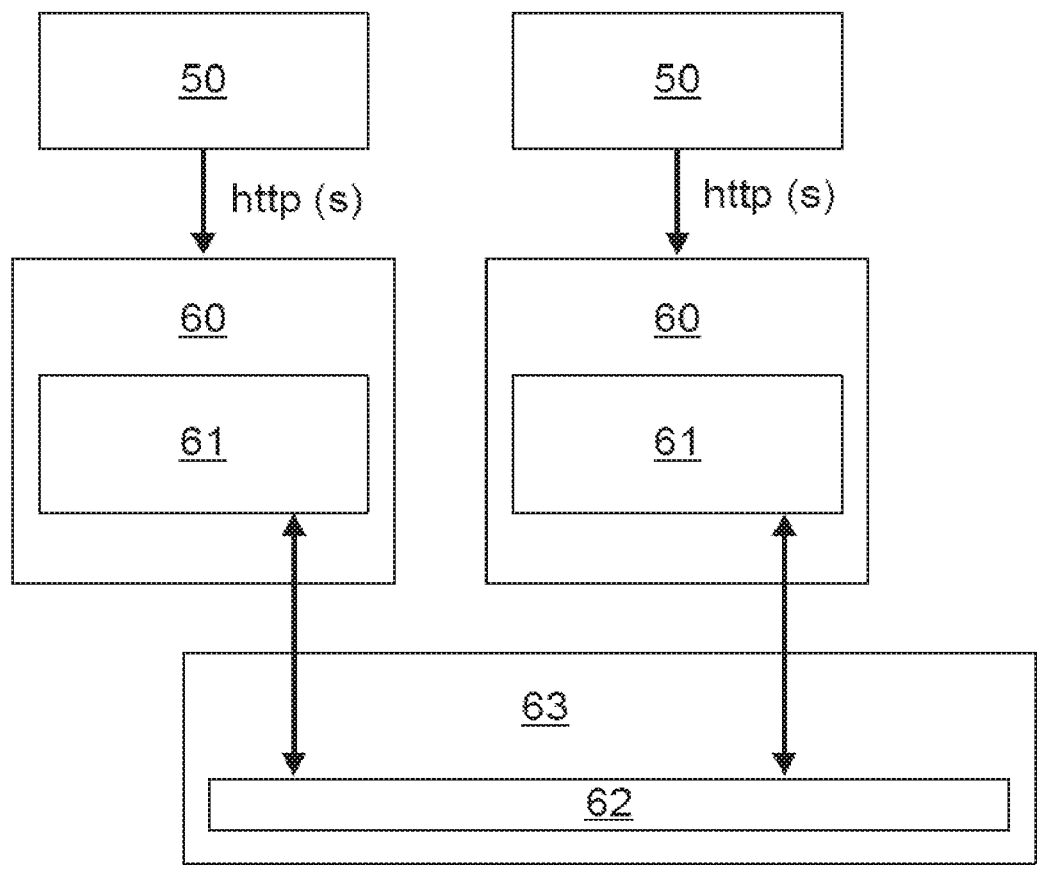
Figure 5C:
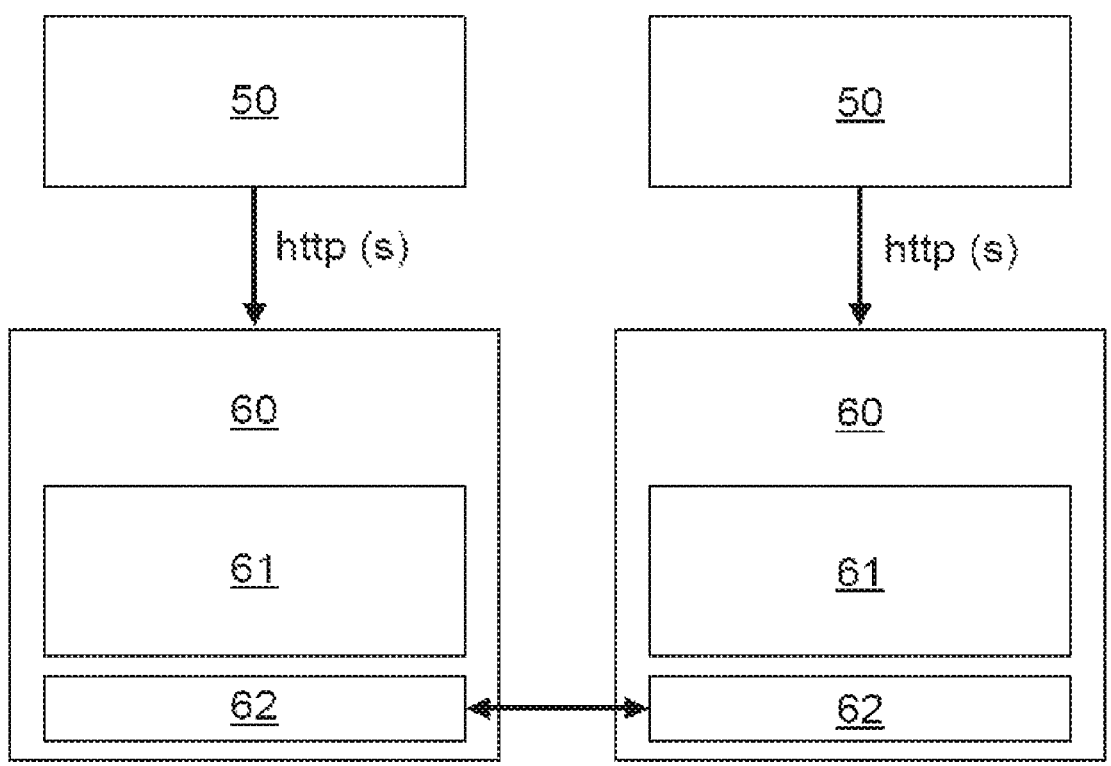
Figure 10:
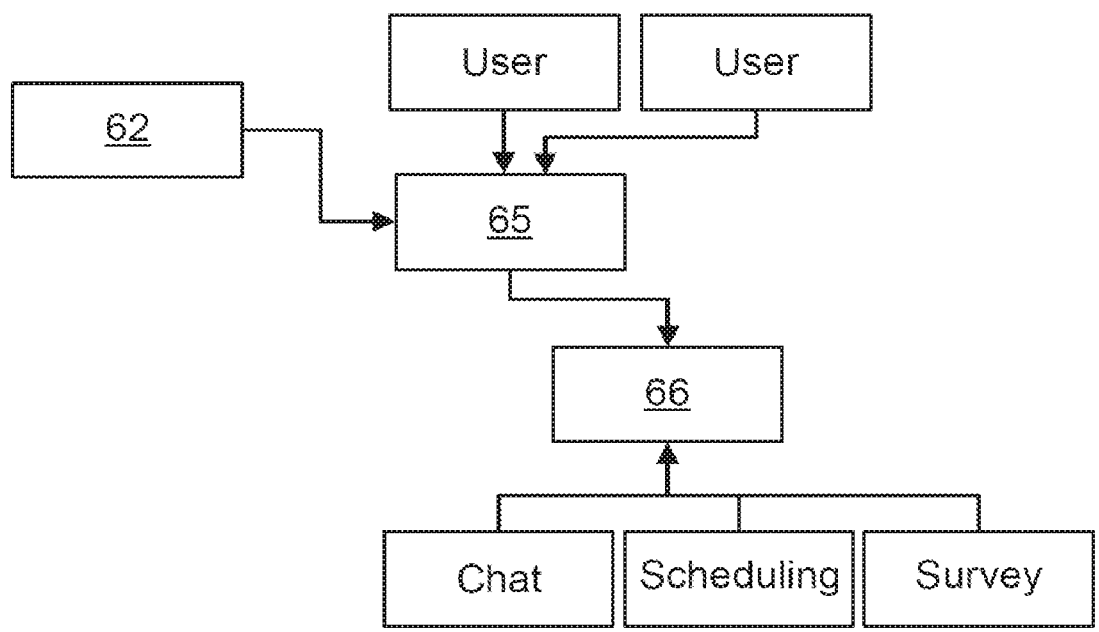
Figure 11:
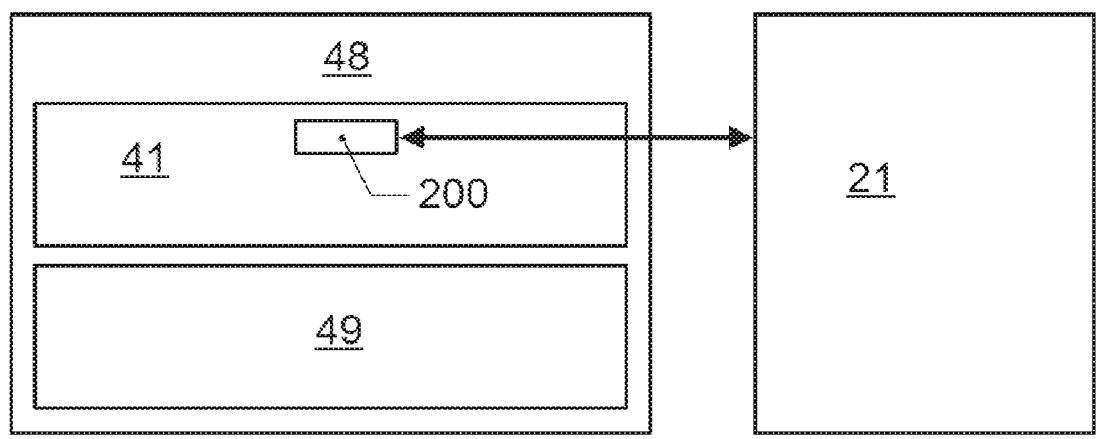

In the following detailed description, presently preferred embodiments of the present invention are further explained, wherein reference is made to the following figures:

FIG. 1: The collaboration screen in an embodiment of the collaboration system;

Figure 2:
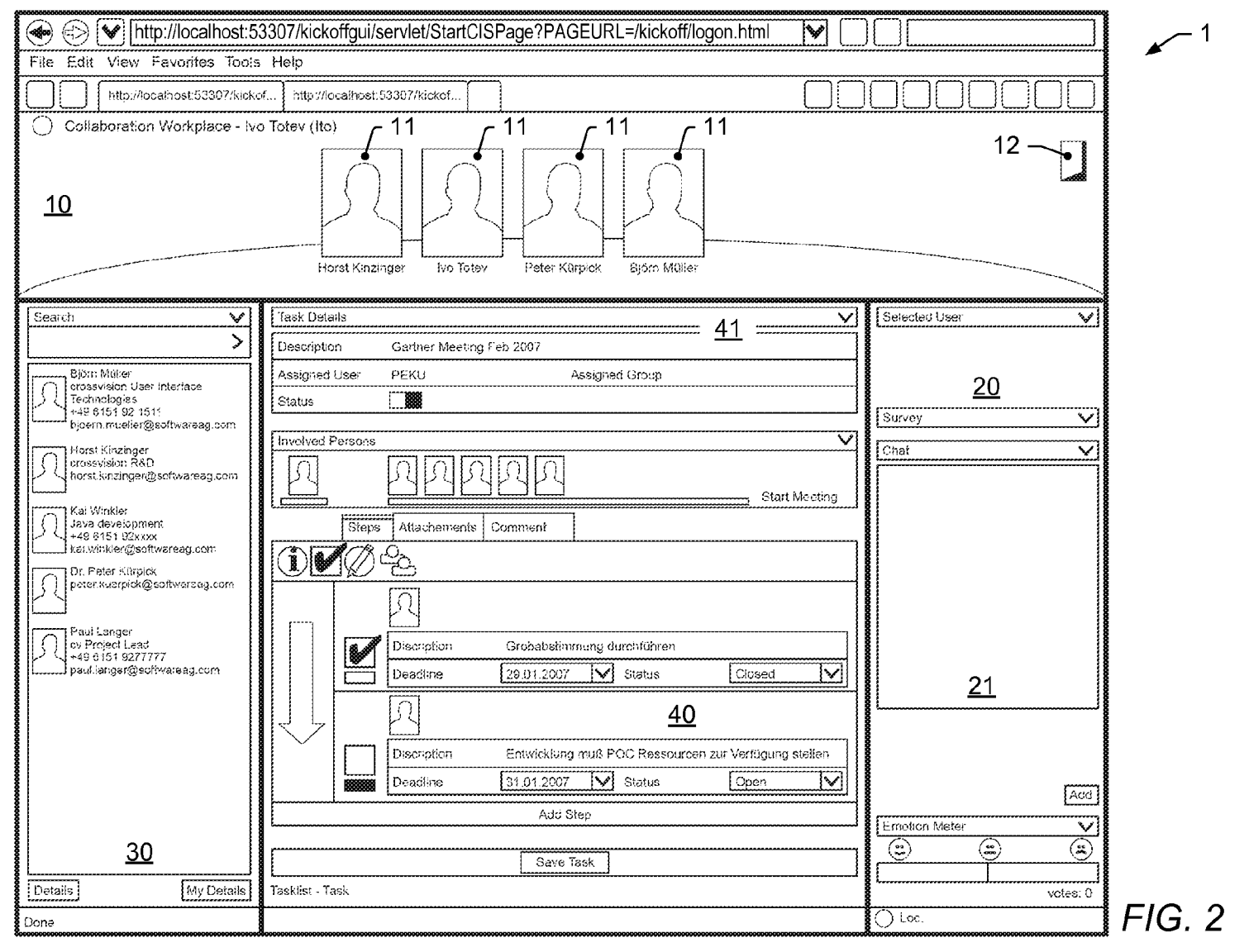

FIG. 2: The collaboration screen displayed in a different style according to the role of the respective user;

FIG. 3: A schematic drawing illustrating the linking of the scheduler collaboration utility to a control element of the user interface of the application according to one embodiment;

FIG. 4: A schematic drawing illustrating the linking of the survey collaboration utility to a control element of the user interface of the application according to one embodiment;

FIG. 5a-c: Exemplary topologies for implementing the collaboration system according to one embodiment;

FIG. 6a, b: Exemplary source code for the interface to access the collaboration bus and to generate an instance of the interface according to one embodiment;

FIG. 7: Exemplary code for implementing a meeting object according to one embodiment;

FIG. 8: Exemplary code for implementing a survey collaboration utility according to one embodiment;

FIG. 9: Exemplary code for implementing a scheduling utility according to one embodiment;

FIG. 10: A schematic overview of the relations between the collaboration bus, the meeting object, the utility instances and the user according to one embodiment;

FIG. 11: A schematic representation of the direct linking of the control elements of the user interface to the respective collaboration utility according to one embodiment;

FIG. 12: An example of a control element being amended to include a collaborative icon according to one embodiment;

FIG. 13a,b: Exemplar code for implementing sharing capabilities for a document according to one embodiment; and FIG. 14: A schematic representation of the data flow in a system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

In the following, various embodiments of a method of collaboration are described. As will become apparent from the explanations below, these embodiments enable end users to jointly work on an application. It supports collaboration scenarios including enabling web cam services or chatting, among others. The underlying collaboration bus, which is described in more detail below, may be built as an open software infrastructure which can easily be plugged around existing application user interfaces and allows for the integration of applications into various collaboration scenarios.

The collaboration system described in the following may be based on certain architectural aspects: A user interface, collaboration utilities, a communication infrastructure and interfaces which allow for the extension of existing applications by adding collaborative functions. The collaboration system may be built on top of the following infrastructure: A web browser as a frontend for the end user and a web server/application server based infrastructure in the backend.

In some embodiments, when operating the collaboration system, the user may be initially requested to log on. During logon, the underlying collaboration bus may be internally initialized and the logon user information may be passed to the bus.

In one embodiment, the collaboration screen 1 may be initially presented to the user, an exemplary embodiment of which is shown in FIG. 1. The screen 1 may be separated into a plurality of areas each of which is individually sizeable. Each area may only be visible if required.

The meeting area 10 may only be displayed if the user is involved in a meeting. In the meeting area 10, the user may be able to see all participants 11 or potential participants which may be likely to take part in the meeting. The participants 11 of a meeting may be either shown as an image or—if available—as an embedded webcam display.

The communication utilities area 20 may also only be displayed if the user is currently involved in a meeting. It may include a collection of communication utilities 21 that allow the participants to share information. One of the examples shown in FIG. 1 is a chat utility.

The contact area 30 may allow the user to browse for contacts. In one example, the contacts may be all the engineers of a company. The contact area may even be extended to use public contact systems (such as www.xing.com).

The application area 40 may be the area in which the user interface 41 of the actual application currently used by a user is presented. Depending on the implementation of the application, user interfaces 41 may be shared by several participants of an online meeting. For example, one user may update the application content while other users observe the changing of content through their own screens and contribute using the collaboration utilities, as described in more detail below.

In some embodiments, the collaboration screen 1 may be built in a way to provide a comfortable atmosphere for online collaboration. To this end, all users/contacts may be shown together with their face in order to allow fast identification and in order to create a human atmosphere. Further, all operations involving users (e.g. adding a user from the contact area 30 into the meeting area 10) may be performed by dragging and dropping the face of the respective user. The meeting area 10 may be designed as an area in which all users sit around a schematically shown rounded table (cf. FIGS. 1, 2).

A meeting can be started in various ways. For example, a user may open up the meeting area 10 and drag and drop other users (e.g. from contacts area 30) into the meeting area 10. Each dropped user may be "seated" in the meeting area 10. As another example, an application may open a meeting from the application area 40. The application may include all potential participants to the meeting area 10.

In any event, the result is a number of potential participants of the meeting being seated in the meeting area 10. The leader of the meeting may be marked, for example with a color bar below the face or webcam stream. The quality or style of the graphical identifier of such an image or webcam stream may reflect the current participation status of the respective user. For example, a light black and white image may indicate that the participant is a potential participant which is not yet invited to take part in the online meeting. An image highlighted in red may reflect that the participant is requested to take part but has not decided yet to join. A presentation as a colored image/webcam could show that the participant has joined the meeting and is actively taking part. Note that these are exemplary only and other indications or embodiments are envisioned.

The process of inviting a potential participant into the meeting may be relatively straightforward. In one embodiment, to invite a participant, the leader of the meeting may select the face or profile of the potential participant. In the meeting area 10, the corresponding face may become highlighted in red. Further, in the screen of the potential user, the meeting area may be opened and the user may be asked to join the meeting. In case the user decides to join the meeting, the image in the meeting area changes to color, or—if available—the live webcam stream of the participant may be displayed, among other possibilities. Participants can leave the meeting any time simply by clicking on the "Leave" icon 12 on the right top of the meeting area 10.

Applications that enable their user interface processing to operate as shared application allow a synchronization of application content inside the application area 40. The synchronization may support the following scenario:

One user may be the editor of the application content. He may be able to update the application content at some point in time. All other users may be observers of the application content. They may see the user interface 41 in a shaded mode, maybe also with different screens according to their authorization profile. FIG. 1 presents the collaboration screen for the editor, whereas FIG. 2 shows the same collaboration screen 1, however with a shaded user interface 41 for an observer.

The synchronization of the content of the user interface 41 may be triggered by the application that runs inside the application area 40. For example, synchronization may be performed whenever the editor saves his data.

The right to operate the user interface may be passed between the participants of the meeting. By default, the leader of the meeting may be the editor. However, the current editor can pass the editor role to another participant, e.g., by clicking below the participant's face or webcam in the meeting area 10. As a consequence, the editing right may be passed to the respective user and the participant now being the new editor is marked with a color bar in the meeting area.

The collaboration area 20 may include a collection of collaboration utilities 21 that allow the sharing of information between participants. For each utility there may be a title bar with the name of the utility. By clicking on the icon on the right of the title bar, the respective utility may be opened. In the example of FIGS. 1 and 2, the "Chat" and the "Emotion-Meter" utilities are opened. The following utilities may be included in the collaboration system: Chat—users can communicate by online chatting; Emotion meter—users can indicate their feelings, the average emotion is shown; Survey—a certain question is asked to all participants, each participant may decide and the result is displayed as a summary; Scheduling—participants can jointly schedule a certain point of time. However, these are only examples of conceivable utilities. Others may be added as required. For example, an engineering application may require different collaboration utilities to be made available to the users as opposed to an accounting application. Generally, there is an open interface for integrating new utilities into the described collaboration system.

Certain collaboration utilities may be directly linked to control elements of the user interface 41. As schematically shown in FIG. 3, the application user interface 41 may, for example, comprise a date picker control element 200 which automatically links decisions about a date selection to a corresponding scheduling utility 21. The scheduling utility 21 may check whether a proposed date is suitable for all participants and may indicate this information preferably through a specific icon (e.g., a "thumb up" icon). When the user represses the icon within the date picker, then the selected date inside the collaboration utility 21 may be taken over into the application user interface 41.

In another scenario, a decision about which option to choose is made using a survey collaboration utility. This is schematically illustrated in FIG. 4. As can be seen, one participant of the meeting voted for "open", two voted for "closed". By re-pressing the icon right to the combo box, the selected value can be taken over into the user interface 41 of the application.

The above two examples illustrate the generic approach of some embodiments, where the operation of a specific icon of a control element which is part of the user interface 41, automatically initializes a collaboration utility 21. The collaboration utility 21 may accordingly enable each participant of the meeting to provide his input, which may then be processed to provide a collaborative input for the user interface 41.

In the following, embodiments of a software architecture for implementing the described collaboration system are explained in more detail, starting with the browser synchronization.

Web browsers have a very defined and limited protocol to connect to application processing on the backend site: The hypertext-transfer-protocol (http). The http is a request oriented protocol allowing the web browser to request information from the backend system (web/application server), but does not provide a default way of communicating data from the backend to the client.

In an online collaboration scenario, two (or more) users may be synchronized and events that occur on in one user's processing need to be transferred to the other users web browser. If, for example, one user inputs a new text within the chat utility, this text needs to be transferred into the chat displays of all other meeting participants.

There are two ways that are offered inside the collaboration bus in order to address this problem:

Constant polling: Each web browser constantly polls the server in order to gather for updated information. If the data transfer between web browser and server is optimized, the data volume that is exchanged by constant polling is not a significant problem. However, there is nevertheless a natural limitation due to the load that is put onto the infrastructure, i.e. the network and the application server, because of the constant sending of small requests, each of which requires the creation of a connection.

An alternative approach is the so-called "Never ending response": In this case, the response uses a so-called "Pushlet"-technology. The response to a request is an infinitely long page. Accordingly, updates can be sent to the browser by adding it to the never ending page. The advantage is that the number of connections that needs to be built up is reduced. On the other hand one connection is blocked "forever". Typically, browsers open two connections to one server, so that two "never ending responses" will cause a browser to be blocked. In some embodiment the collaboration bus offers both ways of synchronizing data content from the backend system to the browser—dependent on its configuration.

In the backend processing, several participants of a meeting may share data and events that need to be exchanged. As a consequence, there may be an infrastructure in which the backend processing of each user can connect to the corresponding meeting data. There are diverse topological scenarios which may be supported:

In the simplest scenario shown in FIG. 5a, the browsers 50 of the participants of a meeting may be logged on to the same application server 60 which also stores the meeting data. The collaboration bus 62 on the server side may be implemented as "global variable" which can be accessed by both sessions 61 of the participants.

In higher traffic scenarios, the web browsers 50 of different users may be logged on to different application server instances 60 in order to balance the processing load. Such a topology is shown in FIG. 5b. The collaboration back end functions may be accessible through a network protocol (e.g. web services). A collaboration server 63 may serve as a central instance which keeps the data for an online collaboration.

Another topology is shown in FIG. 5c: The collaboration bus 62 may not be implemented as a central instance that is accessed by remote protocols, but may itself be distributed on several nodes 60, where the individual sessions 61 of the application may be running. The above described topologies can be combined, depending on traffic, load scenarios and/or other requirements. Additionally, other topologies are envisioned.

The interface of the collaboration bus 62 for an application may be simple. The interface may highly abstract the complexity of exchanging data in a distributed environment, e.g., it may completely hide the above described alternatives of the distribution topology used for its implementation. The interface may offer an object/interface model to the using application. In some embodiments, the interface implementation may always run on the server 60 on which the application is also running—also in a distributed topology in which the collaboration bus 62 itself may run on a central server 63 (cf. FIG. 5b).

An application running on the backend can access the collaboration bus 62 through a defined interface, which is schematically defined by the code fragment of FIG. 6a. Using this interface, an application can add user information to the collaboration bus, log on a current user to the collaboration bus, start new meetings and/or check if the user is currently involved in a meeting, among others. The application gets an instance of the interface using an instance factory, which is illustrated in the code fragment shown in FIG. 6b.

When the user is involved as participant in a meeting or when the user starts a new meeting, the result is a meeting object. There may be one meeting object per online meeting. All participants of an online meeting may "virtually" share the same meeting object. An example of the code defining such a meeting object is illustrated in FIG. 7. The meeting interface may allow for addition or removal of users to a meeting, offering functions to accept meeting invitations, getting information about participants and their role in the meeting (e.g. if they are the leader) and accessing the communication utilities that are available through the collaboration bus, among others.

Each collaboration utility may have an interface that represents the functions that can be performed with the utility. Examples of such interfaces are shown in FIGS. 8 and 9. The survey manager interface of FIG. 8 allows for creating surveys—each survey representing a text that is asked as question and a collection of options that the user can select from. From the surveys, an application can obtain the voting results. The scheduling utility, the interface of which is shown in FIG. 9, may allow for defining a time range and some preferences (e.g. if weekends are selectable). From the utility, the result of the scheduling process can be asked for.

FIG. 10, finally, summarizes the relation between the various components and their interfaces which may be used for the implementation of the collaboration system. One collaboration bus instance 62 may host one (or more) meetings 65. One meeting 65 may have several users as participants, but one user can only be in one meeting 65. A meeting 65 has several utility instances 66—there are several type of instances each one representing a different collaboration utility.

In the following, the integration of an application into the above described collaboration system will be explained more in detail. As mentioned above, the meeting area 10 and the utilities area 20 may be predefined parts of the collaboration screen 1, whereas the application area 40 may contain the user interface 41 determined by the application.

An application that wants to take benefit of the functions offered by the collaboration system has three options to choose from:

- The application starts its user interface inside the frame that is assigned for application purposes, e.g., the application area 40 of the collaboration screen 1. In this case, the application may run embedded inside a collaboration environment but is not actively integrated. The user can invoke collaboration functions inside the surrounding meeting area 10 and the utilities area 20, but there may be no functions inside the application area 40 to, for example, start sharing documents or to directly link control elements to a collaboration utility.
- The application starts its user interface 41 inside the application area 40 and embeds certain collaboration control elements into its user interface 41. For example, the control element for picking a date may be provided with an extended functionality to outsource the decision on a date to a specific collaboration utility, which is then presented in the collaboration utility area 20.
- The application starts its user interface 41 inside the application area 40 and is prepared to take part in application sharing scenarios. In this case, application data can be shared among different observers and the right to edit the application content can be passed from one participant to the other.

Aspects of the above described scenarios can be modified or combined, as desired (e.g., for a certain application).

In one embodiment, the application may be tightly integrated for collaboration. In this case, one or more collaboration controls may be provided in the user interface. Collaboration controls are control elements of the user interface 41 that can be put into the layout definition of a page of the user interface 41.

A normal user interface control may define, for example, a certain data value (e.g. a date) and allow the user to manipulate this data value (e.g. by keyboard input or by selection via a calendar picker). Controls typically have a defined programming interface to an application that uses the control—e.g. a date picker control receives a date from the application and passes back a date accordingly.

As shown in FIG. 11, processing logic 49 may be associated with the application 48. The processing logic 49 may perform the processing associated with the application. For example, if the collaborative application provides collaborative document editing, the processing logic 49 may perform the document editing based on the various user input received. The processing logic 49 may perform other operations based on the type of collaborative application, such as CAD/CAM editing, business or account data processing, etc.

As schematically illustrated in FIG. 11, a collaboration control 200 may be a special user interface control that combines the normal user interface behavior with one or more collaboration utilities 21. It has the advantage that the integration of certain collaboration aspects can be done on user interface level—e.g., without touching the processing logic 49 of the application 48. This is, since it is from the perspective of the processing logic 49 of the application 48 not relevant, whether a certain datum is input by a user directly operating a control element of the user interface or whether the input is the result of using a collaborative utility 21.

The general concept explained above with respect to the schematic drawing in FIG. 11, will be explained in more detail with respect to the exemplary control element shown in FIG. 12. Generally, in a user interface, definition controls can be arranged as XML layout definitions, which serve for generating HTML pages.

The date control 200, which is the result of such a definition, is shown in the upper part of FIG. 12. However, according to one embodiment, the date control 200 may be extended by an icon 201 (cf. lower part of FIG. 12). When a page of the user interface 41, including the modified date control 200, is running inside the application area 41 of the collaboration screen 1 and the user is selecting the icon 201, then the corresponding scheduling utility 21 may be started inside the utilities area 20. In the example of FIG. 12, the utility allows all meeting participants to input some date preferences in order to find a date that is accepted in the whole group of participants. After synchronizing the date within the group, the selected date can be taken over into the application by pressing the icon 201 again (or another "take over" icon or the like).

The same principle may apply to combo boxes which are normally used for allowing a single user to decide among a list of given values. A collaborative combo box (not shown) enables a group of participants to agree which decision to take. Again, the collaboration functions may be accessible through an extra icon of the combo box control. After selecting this icon (not shown), the survey utility may be started, offering the combo items to the group of participants. Each participant can then do the selection on his own, the result being displayed as bars (cf. the example on the right side of FIG. 4) and "the winner" can be taken over into the combo box by clicking on the extra icon a second time.

Clearly, there could be further collaboration controls which can enrich the normal control processing by providing collaboration support. For example, a certain control element might allow passing the editing of a text to a collaboration utility that allows joined text input by the participants of the meeting. The same applies to an image processing tool.

The great advantage of modifying one or more user controls in the described manner is that the processing logic is not affected by the amendments to the user interface of the application. As result, a standard single-user application can be easily and quickly adapted to provide the above described collaboration capabilities.

In the following, the technology is described, which may be used for the sharing of an application among the participants of the meeting. Application sharing generally means that an application's processing supports scenarios in which participants of a meeting can observe one editor's activities, wherein the right to edit an application content can be passed among the participants of a meeting.

Adding sharing capabilities to an application's processing means that the corresponding user interface components need to be updated. The protocol that is provided by the collaboration bus offers a simple way to do so. Some important methods of the interface of the collaboration bus are shown in FIG. 7. The typical usage of the interface of FIG. 7 is as follows: An application is started inside the application area 41. At a certain point of time (e.g. when a user presses a button "Share document", not shown), the application calls the "shareDocument" function, which is exemplary defined in FIG. 13a. As a result, the message that a document is shared, may be passed through the collaboration bus to all participants. Depending on the content of the shared document, a user interface may be triggered in the application area 41 of the collaboration screen 41 of each of the participants. Inside the application processing of the participants, the information about the shared document can be read. In addition, the application processing can ask for information about the currently logged on participant using for example the code shown in FIG. 13b.

Figure 14:
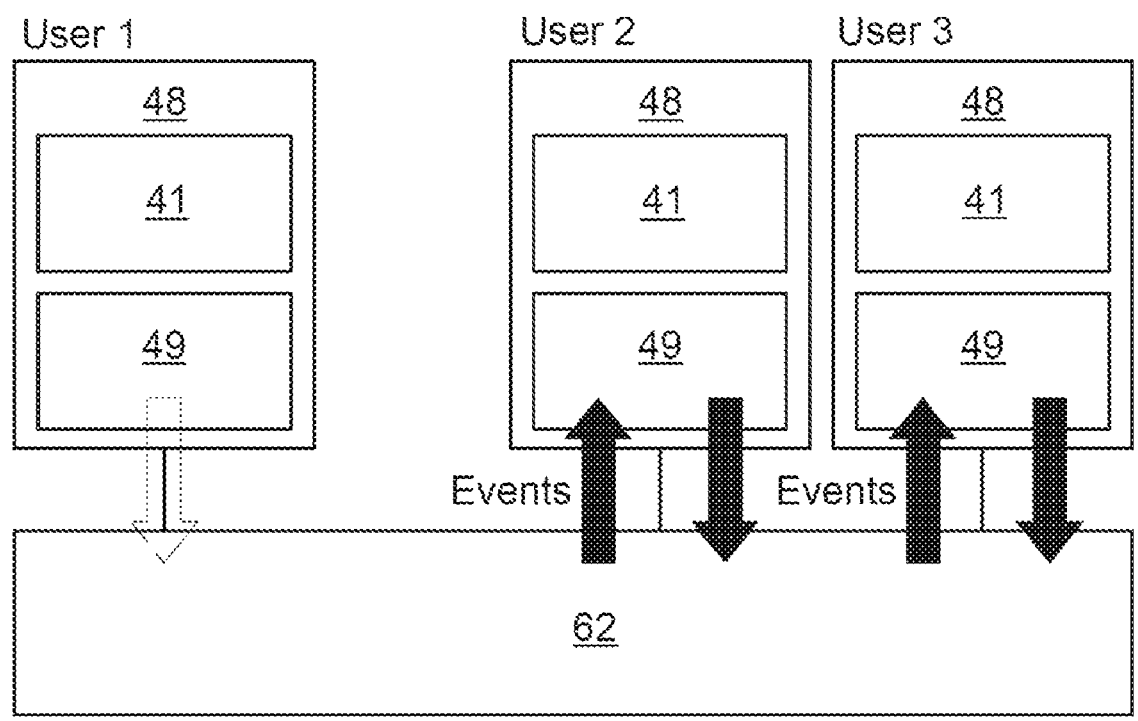

The participant information identifies whether the user is in a role of leading the application (being the editor) or observing the application. Every time the editor of the application makes significant updates, the editor's application processing may update the collaboration bus using the synchronizeDocument(..) method of the IMeeting interface. FIG. 14 schematically summarizes once more the above described processing flow.

The switching of editing rights may be triggered through user operations within the above described meeting area. The application of each participant may be notified and may be switched from "edit" mode into "display" mode or vice versa.

Using the described embodiments, the application sharing may be available essentially without any additional installation efforts. Using their normal web browsers, participants of a meeting can look onto common content. Depending on the application implementation, the application can open different user interfaces for different participants. For example an observer of an application may not see all data that is part of the application because of security restrictions.

The sharing, finally, can be integrated into the application processing so that the application always exactly knows which user is currently manipulating data. This is more than in the prior art scenarios wherein screens are simply shared by the remote desktops of a plurality of users.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer-accessible memory medium storing program instructions for collaboration by a plurality of users, wherein the program instructions are executable to implement:
   a processing logic; and
   a user interface, wherein the user interface comprises at least one control element adapted to receive collaborative input, wherein the at least one control element is linked to a collaboration utility, wherein the collaboration utility is adapted to generate the collaborative input for the at least one control element based on individual inputs of at least two of the plurality of users;
   wherein the at least one control element is adapted to select an option among several options, wherein the collaboration utility is a survey utility configured to invite a plurality of the users to vote for one option among the several options, and generate a collaboratively selected option for input to the at least one control element based on the votes of the users, thereby generating the collaborative input, and wherein the collaboratively selected option is the option that received the most votes among the several options;
   wherein the at least one control element is adapted to automatically provide output as control input to a process to control the process in accordance with the selected option, and wherein the controlled process is separate and distinct from displaying the at least one control element with the selected option; and
   wherein the program instructions are further executable to implement a collaboration screen for the display of the user interface, including display of the at least one control element, wherein the collaboration screen further comprises:
   a collaborative utilities area displaying one or more collaborative utilities; and
   a meeting area displaying graphical identifiers for each of the plurality of users.

2. The non-transitory memory medium of claim 1, wherein the at least one control element comprises a collaborative icon adapted to initiate the linked collaboration utility.

3. The non-transitory memory medium of claim 1, wherein the control element is a date control element and wherein the collaboration utility is a scheduler adapted to generate a collaborative input date based on calendar entries of at least two of the users.

4. The non-transitory memory medium of claim 1, wherein the program instructions are further executable to restrict the right to operate the user interface to one user at a time, wherein the right can be passed from one user to another.

5. The non-transitory memory medium of claim 1, wherein the program instructions are executable to implement a user interface for each of the plurality of users, wherein the user interfaces are adapted to be synchronized in response to a command of the user having presently the right to operate the application.

6. The non-transitory memory medium of claim 1, wherein the graphical identifiers are images or video streams showing the respective user, which are adapted to be presented with varying styles to reflect different roles of the related user during a meeting.

7. The non-transitory memory medium of claim 1, wherein the collaborative utilities area displays one or more collaborative utilities linked to one or more control elements presently displayed in the user interface.

8. The non-transitory memory medium of claim 1, wherein the content of the user interface in the collaboration screen depends on an authorization profile of the respective user.

9. The non-transitory memory medium of claim 1, wherein the collaboration screen further comprises a contacts area indicating further users which can be added to the plurality of users.

10. The non-transitory memory medium of claim 1, wherein a further user is added or removed from the plurality of users by dragging and dropping the respective graphical identifier into or out of the meeting area.

11. The non-transitory memory medium of claim 1, wherein the collaboration screen is adapted to be presented by browsers of the plurality of users and wherein the processing logic is adapted to be implemented in one or more processing servers.

12. The non-transitory memory medium of claim 1, wherein the program instructions are further executable to implement a collaboration bus, which is adapted to be implemented in one or more servers and which serves to maintain application data shared by the plurality of users.

13. A method for enabling collaboration of a plurality of users in the operation of an application, wherein the application comprises a user interface and processing logic, the method comprising the steps of:
   utilizing a computer to perform:
      providing at least one control element of the user interface which is linked to a collaboration utility, the collaboration utility being adapted to generate a collaborative input for the at least one control element based on the individual inputs of at least two of the plurality of users;
wherein the at least one control element is adapted to:
select an option among several options, wherein the collaboration utility is a survey utility configured to invite a plurality of the users to vote for one option among the several options, and generate a collaboratively selected option for input to the at least one control element based on the votes of the users, thereby generating the collaborative input for the at least one control element, wherein the collaboratively selected option is the option that received the most votes among the several option;
processing the collaborative input with the processing logic of the application, wherein said processing comprises:
providing, by the at least one control element, output as control input to a process
to control the process in accordance with the selected option, and wherein the controlled process is separate and distinct from displaying the at least one control element with the selected option;
performing one or more actions based on said processing; and
wherein the user interface, including the at least one control element, is displayed in a collaboration screen, wherein the collaboration screen comprises:
a collaborative utilities area displaying one or more collaborative utilities; and
a meeting area displaying graphical identifiers for each of the plurality of users.

14. The non-transitory memory medium of claim 12, wherein the collaboration bus comprises an interface for performing collaborative functions, when executing the application.

15. The method of claim 14, wherein said providing comprises modifying the control element adapted for receiving individual input so that it is bound to the collaboration utility.

16. The method of claim 14, wherein said providing comprises adding a collaborative icon to the control element, the icon being adapted to initiate the linked collaboration utility.

17. The method of claim 14, wherein the control element is a date control element and wherein the collaboration utility is a scheduler which generates a collaborative input date based on calendar entries of at least two of the users.

18. The method of claim 14, further comprising:
restricting the right to operate the user interface to one of the users at a time.

19. The method of claim 18, further comprising:
passing the right from one user to another.

20. The method of claim 18, wherein said providing comprises providing a user interface for each of the users, wherein the user interfaces are adapted to be synchronized in response to a command of the user having presently the right to operate the application.

21. The method of claim 14, wherein the content of the user interface for a user depends on his authorization profile.

* * * * *

UNITED STATES PATENT AND TRADEMARK OFFICE
CERTIFICATE OF CORRECTION

PATENT NO.         : 8,281,248 B2
APPLICATION NO.    : 11/949151
DATED              : October 2, 2012
INVENTOR(S)        : Peter Kurpick et al.

Page 1 of 1

It is certified that error appears in the above-identified patent and that said Letters Patent is hereby corrected as shown below:

Column 14, Claim 15, Line 7, please delete "The method of claim 14, wherein" and substitute -- The method of claim 13, wherein --.

Column 14, Claim 16, Line 10, please delete "The method of claim 14, wherein" and substitute -- The method of claim 13, wherein --.

Column 14, Claim 17, Line 13, please delete "The method of claim 14, wherein" and substitute -- The method of claim 13, wherein --.

Column 14, Claim 18, Line 17, please delete "The method of claim 14, further" and substitute -- The method of claim 13, further --.

Column 14, Claim 21, Line 27, please delete "the method of claim 14, wherein" and substitute -- The method of claim 13, wherein --.

Signed and Sealed this
Eleventh Day of December, 2012

David J. Kappos
*Director of the United States Patent and Trademark Office*